US011229991B2

(12) United States Patent
Rogers et al.

(10) Patent No.: US 11,229,991 B2
(45) Date of Patent: Jan. 25, 2022

(54) MANIPULATING HOLD DOWN FOR SHEARING AND OTHER MACHINES

(71) Applicants: William Douglas Rogers, Bentley, LA (US); Richard D Rogers, Bentley, LA (US)

(72) Inventors: William Douglas Rogers, Bentley, LA (US); Richard D Rogers, Bentley, LA (US)

(*) Notice: Subject to any disclaimer, the term of this patent is extended or adjusted under 35 U.S.C. 154(b) by 317 days.

(21) Appl. No.: 16/510,885

(22) Filed: Jul. 13, 2019

(65) Prior Publication Data

US 2020/0030946 A1   Jan. 30, 2020

Related U.S. Application Data

(60) Provisional application No. 62/920,618, filed on May 8, 2019, provisional application No. 62/764,373, filed on Jul. 30, 2018.

(51) Int. Cl.
*B25B 11/00* (2006.01)
*B21D 28/26* (2006.01)

(52) U.S. Cl.
CPC .......... *B25B 11/002* (2013.01); *B21D 28/26* (2013.01)

(58) Field of Classification Search
CPC ....... B25B 27/00; B25B 11/002; B25B 11/00; B21D 28/26
See application file for complete search history.

(56) References Cited

U.S. PATENT DOCUMENTS

| 6,092,271 A * | 7/2000 | Stojkovic ............... B25B 27/00 269/8 |
| 8,251,358 B2 * | 8/2012 | Grolman ............... B25B 1/2405 269/275 |
| 2013/0205557 A1 * | 8/2013 | MacArthur ............. B25B 27/08 29/278 |
| 2020/0030946 A1 * | 1/2020 | Rogers .................. B25B 11/002 |

* cited by examiner

*Primary Examiner* — Lee D Wilson
(74) *Attorney, Agent, or Firm* — Rodney B Jordan

(57) ABSTRACT

An apparatus for use with various shearing machines for safely and efficiently positioning material to be worked. Magnets which control the material are embedded in a body made of non-magnetic material. Magnets are positioned in the forward end of the apparatus for holding the material being worked while other magnets are positioned in the body of the apparatus for adhering the apparatus to the machine table. A handle is provided for sliding the material into the proper position.

8 Claims, 6 Drawing Sheets

MANIPULATING HOLD DOWN FOR SHEARING AND OTHER MACHINES

CROSS-REFERENCE TO RELATED APPLICATIONS

Applications for which benefit is being claimed:
1. Provisional application No. 62/764,373 filed by William D. Rogers and Richard D Rogers entitled Manipulating Hold Down (MHD) for Shearing Machines Etc. on Jul. 30, 2018.
2. Provisional application No. 62/920,618 entitled Manipulating Hold Down (MHD) for Shearing etc., filed by William D Rogers and Richard D Rogers on May 8, 2019, a continuation in part of provisional application No. 62/764,373.

BACKGROUND OF THE INVENTION

Manufacturing of metal goods has long been an important part of our national economy and a major source of our national wealth. Our economy has long enjoyed a competitive edge as a result of the quality of the machinery employed. In order to insure that this competitive edge is maintained, it is extremely important that these machines be constantly improved. One such group of machines is press brakes, coper/notchers, and particularly, shears. The invention as described herein provides a significant improvement in these machines in regard to efficient use of material, speed of operation and in particular, safety.

DESCRIPTION OF THE PRIOR ART

At present there is no effective way to control the material being worked other than with the machine operator's hands. This only works well with the use of large pieces of stock. Often useable, valuable material is discarded as scrap in order to keep fingers a safe distance from the moving parts of a machine. Even more concerning, many times machine operators are tempted to work with smaller and smaller pieces of stock, in order to save time or money. This inevitably leads to injury, sometimes resulting in legal action against the company employing the operator, loss of time and production, and the loss of a highly trained worker. Safety conscious use of the manipulating hold down device begins well outside or beyond the OEM guards and hold downs, and continues under and within their confines. When heavy plate is being pushed the hands may slip. When they do, they usually move a dangerous distance before they are stopped. These are problems of grave concern to today's manufacturers. Solutions to these problems were offered in provisional application No. 62/764,373 filed by William D. Rogers and Richard D Rogers on Jul. 30, 2018 entitled Manipulating Hold Down (MHD) for Shearing Machines Etc. Further solutions were offered in provisional application No. 62/920,618 entitled Manipulating Hold Down (MHD) for Shearing etc., filed by William D Rogers and Richard D Rogers on May 8, 2019, a continuation in part of provisional application No. 62/764,373. These solutions are further addressed by this application.

BRIEF DESCRIPTION OF THE DRAWINGS

FIG. (1) is a side elevation view of the manipulating hold down device.

FIG. (2) is a bottom elevation view of the manipulating hold down device.

Figure 1:
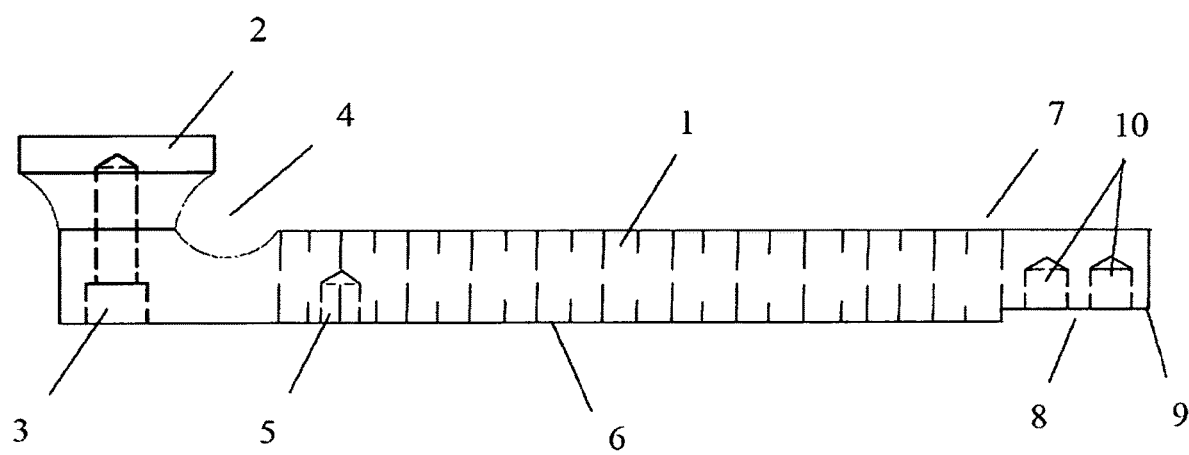
Figure 2:
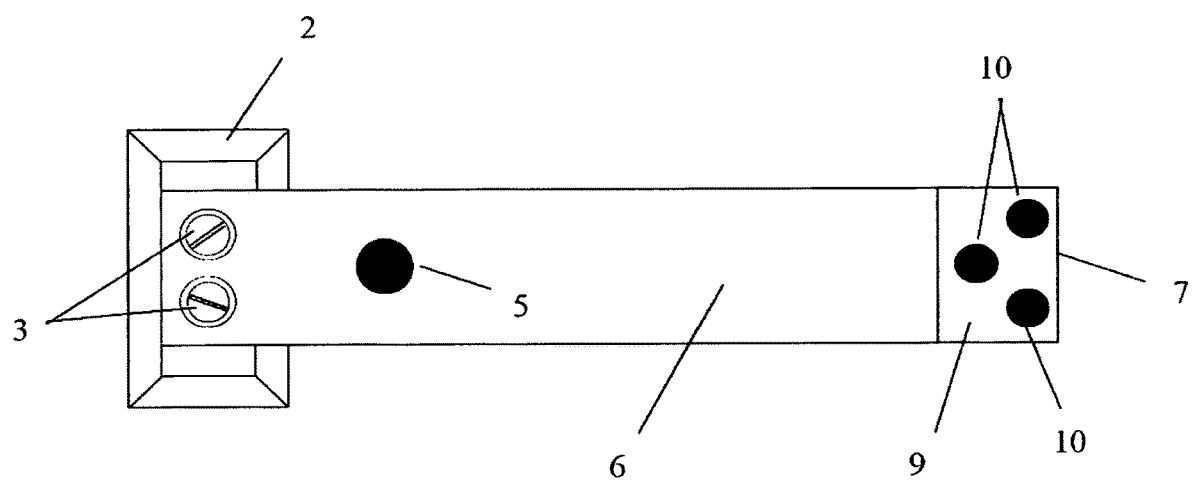
Figure 3:
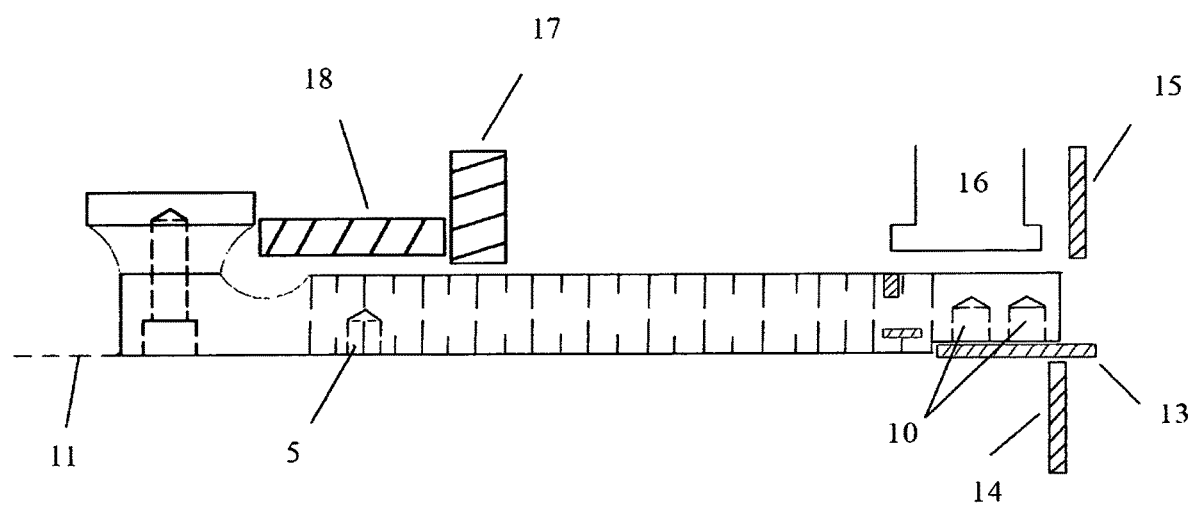
Figure 4:
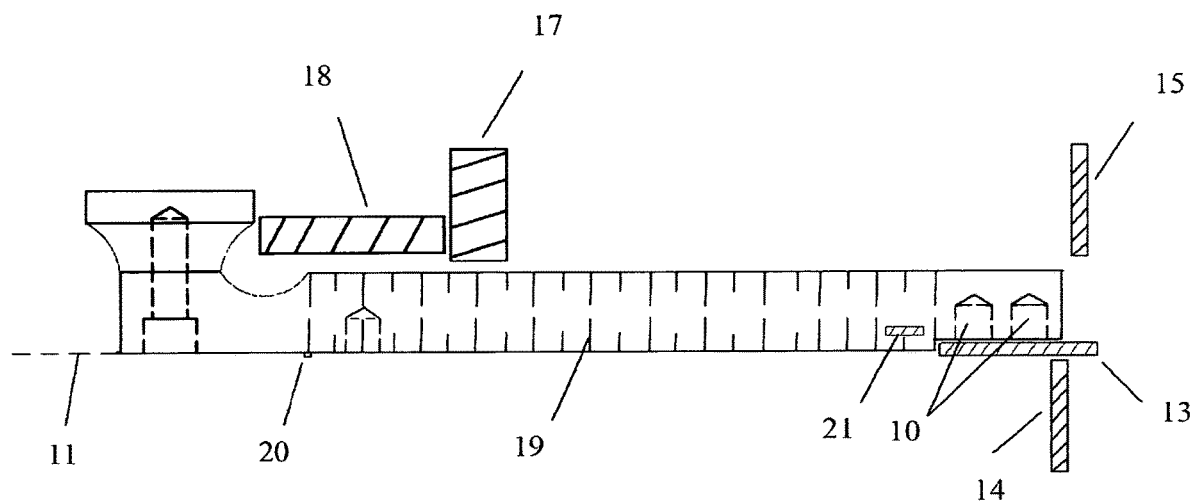
Figure 5:
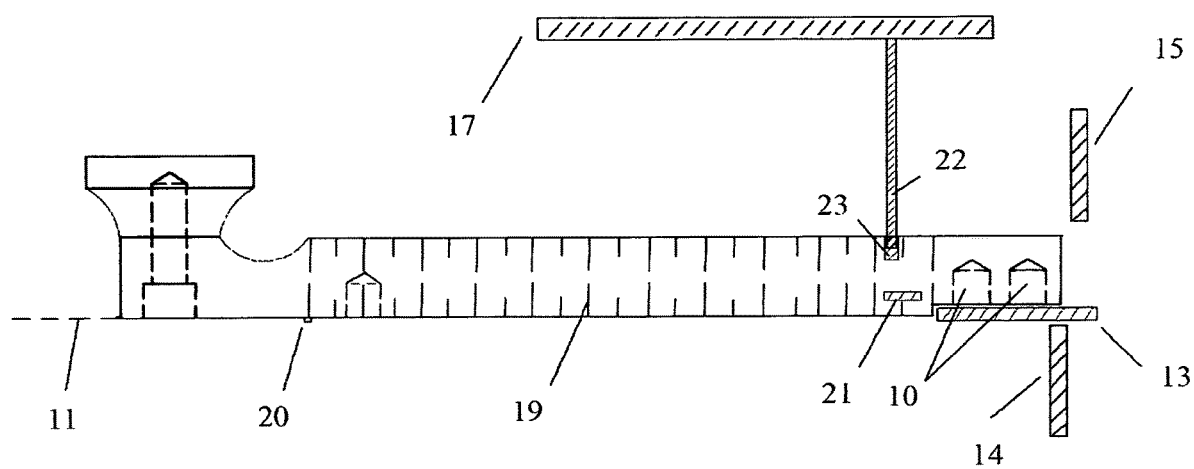
Figure 6:
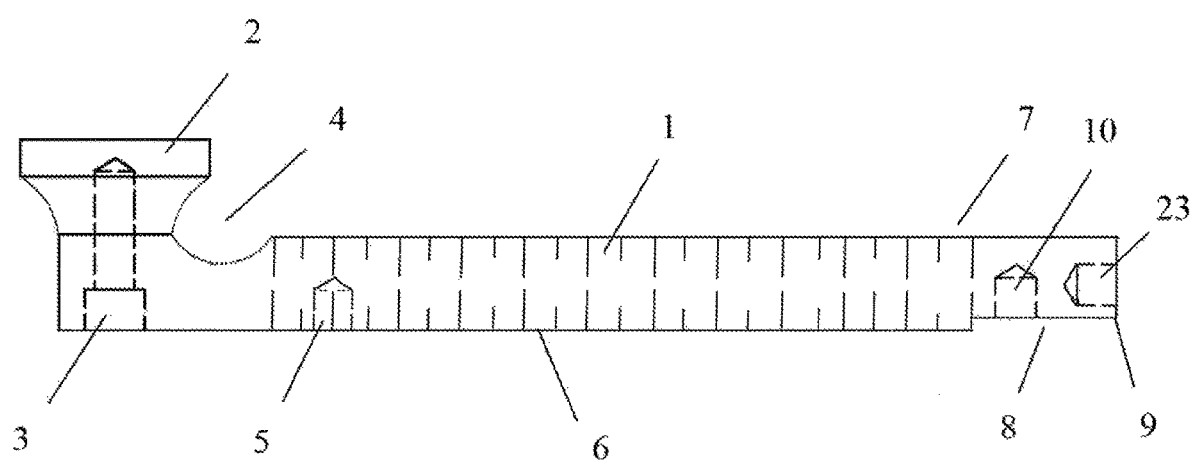

FIG. (3) is a side elevation view of the manipulating hold down device employed on a shearing machine.

FIG. (4) is a side elevation view of the manipulating hold down device showing additional features.

FIG. (5) is a side elevation view of the manipulating hold down device set up for use with a coper/notcher.

FIG. (6) is a side elevation view of the manipulating hold down device showing the forward facing positioning magnet.

DETAILED DESCRIPTION

Referring to FIGS. (1) and (2), it can be seen that the manipulating hold down device comprises an elongated body 1, and a cleat handle 2. cleat handle 2 is affixed to elongated body 1 by way of fastener screws 3. Cleat handle 2 and elongated body 1 are so formed as to provide finger pocket 4 so that the operator may ergonomically and safely grasp cleat handle 2, thereby controlling the manipulating hold down device. Elongated body 1 is made of non ferrous, non-magnetic material and rests on the flat surface of the work table of a sheet or plate sheer machine on flat under body surface 6. Table magnet 5 is a magnet that is embedded in elongated body one. Table magnet 5 is embedded into elongated body 1 flush with the under body surface 6 of elongated body 1. The purpose of table magnet 5 is to hold elongated body 1 to the flat work table of a sheet or plate shearing machine. The forward end 7 of under body 6 is equipped with a cutaway section. This cutaway section is rectangular and of a specific height, forming a sized and appropriate cavity 8. The under surface 9 of elongated body 1 above sized and appropriate cavity 8 is in the same plane as under body surface 6 of elongated body 1. A plurality of work piece magnets 10 are embedded in forward end 7, flush with under surface 9.

Referring to FIG. (3) it can be seen that the manipulating hold down device is set upon machine table 11 of a shearing machine. Under body surface 6 of the manipulating hold down device is magnetically held to machine table 11 by table magnet 5. The strength of table magnet 5 is proper in magnitude to adhere the manipulating hold down device to the machine table 11, yet allow the operator to move the manipulating hold down device in the plane of the machine table 11 by grasping cleat handle 2. The functional purpose of table magnet 5 is not only to hold the manipulating hold down device to the table, but table magnet 5 is also a safety device that snaps down fast to eliminate any pinch point space for body parts beneath the manipulating hold down device as downward force is applied during operation. Another safety feature of the manipulating hold down device is that it will not only push a work piece into a machine, as many tools will, but will also retrieve the material without the operator reaching into the machine as work piece magnets 10 continue to adhere to the worked material. Work piece 13 is held parallel to and affixed to under surface 9, largely within sized and appropriate cavity 8 by work piece magnets 10. Sized and appropriate cavity 8 is sized to grasp work piece 13 against table 11 when hydraulic hold down 16 is tightened upon the manipulating hold down device. Ideally work piece 13 should be just slightly thicker than sized and appropriate cavity 8, assuring that work piece 13 is held tightly to work table 11. Otherwise the plate will creep during the shearing process. By grasping cleat handle 2, work piece 13 may be inserted properly to be sheared by lower shear blade 14 and upper shear blade 15. The operators fingers need not approach the danger of shear blades 14 and 15 or hydraulic hold down 16. A guard 17 is provided to keep the operator's fingers from approaching hydraulic hold down 16 and shear blades 14 and 15. An appropriately sized block 18 may be placed between cleat handle 2 and guard 17 to assure that forward end 7 does not extend far enough to contact shear blades 14 and 15. Using the manipulating hold down device allows the operator to make use of small work pieces while keeping fingers a safe distance from dangerous moving and cutting parts.

Referring to FIG. (4), it can be seen that the manipulating hold down device is equipped with a graduated scale 19. It can also be seen that a reference groove 20 has been etched into machine table 11. By aligning the marks of the graduated scale 19 to the reference groove 20, very precise cuts may be made without having sight of the shear blades. Any number of reference lines or marks may be employed as well as the reference groove 20. A stabilizer magnet 21 is embedded into elongated body 1 near sized and appropriate cavity 8. This magnet increases the adherence of the manipulating hold down device to machine table 11 and helps hold work piece 13 in place.

Referring to FIG. (5), it can be seen that there is a coper/notcher modification stud 22 threaded into threaded hole 23. A hold down plate 17 has been added to a coper/notcher which typically has no hold down features. The upper end of modification stud 22 makes contact with hold down plate 17, thus allowing the manipulating hold down device to provide hold down to the material being worked. This feature allows the manipulating hold down device to be used with a variety of iron worker machines without hydraulic hold down devices such as coper/notchers. The manipulating hold down device also works well with press brakes and many other machines although procedures may be slightly different.

Referring to FIG. (6), it can be seen that a forward facing positioning magnet 23 is embedded into forward end 7 of elongated body 1. This allows a second manipulating hold down device to be used as a control device in positioning lengthy or oddly shaped work pieces for even more accurate and safe operation.

In cases where the machine table 11 is limited and the work piece 13 is extended a distance beyond the table, the manipulating hold down device can be used with under body 6 facing up. This supports the work piece weight and allows the operator to avoid the cuts and punctures which may be caused by the sharp edges and corners of the work piece. An elongated work piece is inherently subject to sudden movements during the mechanical cycle of any machine. Such sudden movements and sharp edges are best avoided by removing hand contact with the work piece 13. Once the work piece is completely on the table the manipulating hold down device can be turned over and the operator may proceed as described herein.

It can be seen that from the above that the manipulating hold down device becomes part of the hand as well as the OEM hold down and thereby expands their reach. It can also be seen that the manipulating hold down device becomes part of the work piece 13 by expanding its dimensions.

We claim:

1. An apparatus for use with a sheet or plate shear machine, having a table surface, for holding down material being sheared comprising;
    a. an elongated body, said body being formed from non magnetic material, said body having a flat under body surface, an upper surface and a forward and rearward end, a cleat handle affixed to said rearward end, said forward end further comprising a cutaway forming a cavity, said cavity having an under surface, said under surface being in the same plane as said under body surface, said cavity having a specific height so as to accommodate a specific thickness of material being sheared,
    b. a magnet, said magnet being embedded into and even with said under-body surface of said elongated body so as to magnetically adhere said under body surface of said elongated body to said table surface of said sheet or plate shear, and
    c. a plurality of magnets embedded into said forward end of said elongated body even with said under surface of said cavity so as to magnetically attract and hold said material being sheared.

2. An apparatus as described in claim 1, wherein said elongated body further comprises an upper surface, said upper surface being equipped with a curved cavity just forward of said cleat handle thereby forming a finger pocket for safe, secure grasping.

3. An apparatus as described in claim 2, wherein said table surface has a reference mark, said elongated body further comprises a graduated scale to be used with said reference mark to determine the position of said forward end of said elongated body.

4. An apparatus as described in claim 3, wherein a positioning magnet is embedded into said forward end of said elongated body.

5. An apparatus as described in claim 4, wherein said sheet or plate shear has a safety guard, said apparatus further comprising a limiter block, said limiter block being placed between said safety guard and said cleat handle for repeated cuts of a specific size.

6. An apparatus as described in claim 5, wherein said machine has a rigid upper surface and said elongated body further comprises an upper surface, a threaded hole formed in said upper surface and a threaded stud screwed into said threaded hole, said threaded stud having an upper end, said upper end contacting said rigid upper member of said machine.

7. An apparatus as described in claim 6, wherein a stabilizer magnet is embedded in said forward end of said elongated body near said material being sheared and said table surface.

8. An apparatus as described in claim 1 having a table surface for holding down material being sheared comprising, an elongated body, said body being formed from non magnetic material, said body having a flat under body surface, an upper surface and a forward and rearward end, a cleat handle affixed to said rearward end said forward end further comprising a cutaway forming a cavity, said cavity having a flat under surface, said flat under surface being in the same plane as said flat under body surface said cavity having a specific height so as to accommodate a specific thickness of said material being sheared.

* * * * *